United States Patent [19]
Chien et al.

[11] 3,818,502
[45] June 18, 1974

[54] AUTOMATIC HEAD WIDTH CORRECTION

[75] Inventors: Jack Hui-Ning Chien; Richard Karl Oswald, both of San Jose, Calif.

[73] Assignee: International Business Machines Corporation, Armonk, N.Y.

[22] Filed: Sept. 5, 1972

[21] Appl. No.: 286,000

[52] U.S. Cl. .................... 360/77
[51] Int. Cl. .................... G11b 5/56
[58] Field of Search .............. 340/174.1 C, 174.1 B; 179/150.2 S

[56] References Cited
UNITED STATES PATENTS

| | | | |
|---|---|---|---|
| 3,263,031 | 7/1966 | Welsh | 340/174.1 C |
| 3,593,333 | 7/1971 | Osweld | 340/174.1 B |

*Primary Examiner*—Vincent P. Canney
*Attorney, Agent, or Firm*—Edward M. Suden

[57] ABSTRACT

The invention relates to means for compensating for variations in the effective head gap width of a servo transducer used in a track following servo system and more specifically used within the environment of a magnetic storage system. The compensation is obtained by modifying the gain characteristic of the position error generating circuitry within the track following servo system. The method of determining the value of the compensating means and for its physical and electrical insertion position within the position error generating circuitry for different partitioned magnetic disk storage systems is also disclosed. In its simplest form, the compensating means is a resistor placed in series with the reference voltage in the AGC circuitry of the position error generating circuitry.

23 Claims, 4 Drawing Figures

PATENTED JUN 18 1974 3,818,502

AUTOMATIC HEAD WIDTH CORRECTION

BACKGROUND OF THE INVENTION

1. Field of the Invention

The invention relates to a method and apparatus for electrically compensating for variations in the effective head gap width of a servo transducer used in a track following servo system. More specifically, the track following servo system is embodied in a magnetic storage system such as a magnetic disk storage system.

2. Prior Art

Wide use is now being made of track following servo systems in the transducer positioning systems of magnetic disk storage systems. One example of such a system is the IBM 3330 Magnetic Disk Storage System. Such systems include a position error generating circuitry within the track following servo system. The position error generating circuitry produces an error signal that is indicative of the displacement of the servo transducer from the boundary of two adjacent servo tracks, where the boundary identifies the center position of a corresponding data track. The position error generating circuitry further makes use of automatic gain control circuitry such that variations in such parameters as flying height, variations in thickness of the magnetic coating on the servo disk or minor variations in the gain characteristic of the electronic circuitry do not produce erroneous position error signals.

Position error circuitry of the type used is taught in U.S. Pat. Nos. 3,534,344 entitled "Method and Apparatus for Recording and Detecting Information," by G. R. Santana and assigned to the same assignee; 3,593,333 entitled "Position Detection for a Track Following Servo System," by R. K. Oswald, assigned to the same assignee; and 3,691,543 entitled "Position System Including Servo Track Configuration and Associated Demodulator," by F. E. Mueller and assigned to the same assignee.

All of the three patents teach the use of servo patterns which encompass position, timing, and gain control information. The signal generated in the servo transducer is processed into two signals, A and B, by a demodulator. The two signals are subtracted to obtain the error position signal $(A - B)$ and added to obtain the gain control signal $(A + B)$.

The position error signal VE is equal to $k\ (A - B)$ where $k$ is determined by comparing the gain control signal $(A + B)$ to the AGC reference voltage. Thus, variations in the gain control signal directly affect the value of the position error signal. The displacement of the servo head to the boundary dictates the value of $(A - B)$. This displacement is not reflected into the gain control $(A + B)$ since displacement is not a parameter that affects the magnitude of the summation of the two components A and B.

The signal strength of the signal generated in the servo transducer is a function of the actual gap width of the servo transducer and the actual gap width of the servo tracks. These two parameters affect the magnitude of the summation of the two components.

In designing the position error control circuitry, parameters are picked for the actual gap width of the servo transducer and the track width associated with the servo track. For such a set of parameters, the automatic gain control reference signal is adjusted so as to maintain the gain of the position error generating circuitry at such a value that variations in the flying height of the magnetic servo transducer or differences in the thickness of the disk coating on the servo disk or variations in the gain of the electronic circuitry will automatically be compensated for and a correct position error signal will be generated at the output of the position error generating circuitry.

The effective gap width of the servo transducer is comprised of the actual gap width of the servo transducer and the actual track width of the servo tracks on the servo surface. For each set of these parameters that gives rise to a different effective head gap width has associated with it a unique value for the reference voltage for the automatic gain control circuitry such that proper compensation is obtained. In the design of positioning systems for use in commercial memory storage systems, uniformity between magnetic memory systems of the same type is highly desirable. In order to obtain this uniformity, great care has been taken to maintain the actual gap width of the servo transducer and the actual track width of the servo tracks on the servo surface within very tight tolerances such that the same reference voltage may be used in all systems.

Magnetic memory systems of the random access disk type may be said to be partitioned into three different configurations. The first configuration is that of the fixed disk type. That is, the disks are permanently mounted within the disk drive unit and the data transducers are positioned to desired data tracks and maintained at the center of the desired data tracks by means of a track following servo positioning system.

The second configuration is that of a disk drive unit used in cooperation with any one of a number of disk packs. Each disk pack contains one or a plurality of magnetic disks mounted to a spindle such that when the disk packs are mounted within the disk drive unit, they form the magnetic memory system. The main advantage of such a system is that disk packs may be stored off-line, thereby making more efficient use of the disk drive unit. Here again, when the disk pack is mounted into the disk drive, the data heads are positioned at a desired track and maintained at that track by a track following servo system.

A third configuration is that of a disk drive unit again using a disk pack. Here the disk pack not only contains one or more magnetic disks but also contains the servo and data transducers mounted to a carriage assembly. When this disk pack is mounted within the disk drive unit, connection is made between the spindle to provide rotational movement to the magnetic disks, electrical connection is made to the read/write circuitry for the data heads, either electrical or mechanical connection is made between the means for moving the carriage assembly and finally electrical connection is made to the servo transducer to obtain a servo signal for positioning and maintaining the data heads at a desired track.

In the first two participating configurations, the servo transducer remains with the disk drive unit and therefore, the approach of maintaining the tight tolerances for the gap width of the servo transducer and the track width of the servo tracks on the servo surface could be manufactured within a reasonable cost. However, with the trend of ever-increasing track density, the ability of the industry to maintain the required strict tolerances on these components becomes very difficult and very expensive.

In the third configuration where the servo transducer is maintained within the disk pack, the sensitivity to variations in the effective gap width of the servo transducer is greatly magnified by the increased number of servo transducers that must now be used. Of course, the increase of track density trend within the industry causes the same problem within this configuration as it did within the previous two configurations.

It is therefore an object of this invention to provide a new means for compensating for variations in the effective gap width of the servo transducer such that tolerances in the manufacturing of the servo transducer may be greatly relaxed while allowing readily replaceability of the servo transducer within the magnetic memory systems.

It is still another object of the invention to provide a method for determining the value of the compensating means and for the placement of the compensation within the position error generating circuitry of the track following servo system of the positioning system used within the magnetic memory storage system.

It is still another object of the invention to provide a compensating apparatus for variations in the effective gap width of the servo transducer in existing machines such that the cost of manufacturing the existing machines may be substantially reduced while ease of manufacturing may be substantially increased.

SUMMARY OF THE INVENTION

This invention relates to an apparatus for compensating for variations in the effective gap width of the servo transducer used within a track following servo system. The desired compensation is obtained by placing a resistor in selective positions within the error positioning circuitry of the track following servo system such that the gain characteristic of the error positioning circuitry produces the correct error position signal for a given displacement of the servo transducer from its nominal position. The value of the given resistor is found by an empirical method. The resistor of a correct value is then co-mounted with the servo transducer such that the correct resistor will always be with the servo transducer with which it is associated.

The advantage of this invention is that it allows the manufacturing cost of the servo transducers to be reduced while increasing the ease in manufacturing of the servo transducer. In the third type of configuration heretofore discussed, it also allows the servo track width tolerance to be reduced, resulting in another reduction of cost while increasing the ease of manufacture.

BRIEF DESCRIPTION OF THE DRAWINGS

The foregoing and other objects, features and advantages of the invention will be apparent from the following, more particular description of the preferred embodiments of the invention, as illustrated in the accompanying drawings, in which.

DETAILED DESCRIPTION OF PREFERRED EMBODIMENTS

Figures 1, 2, 3, 4:
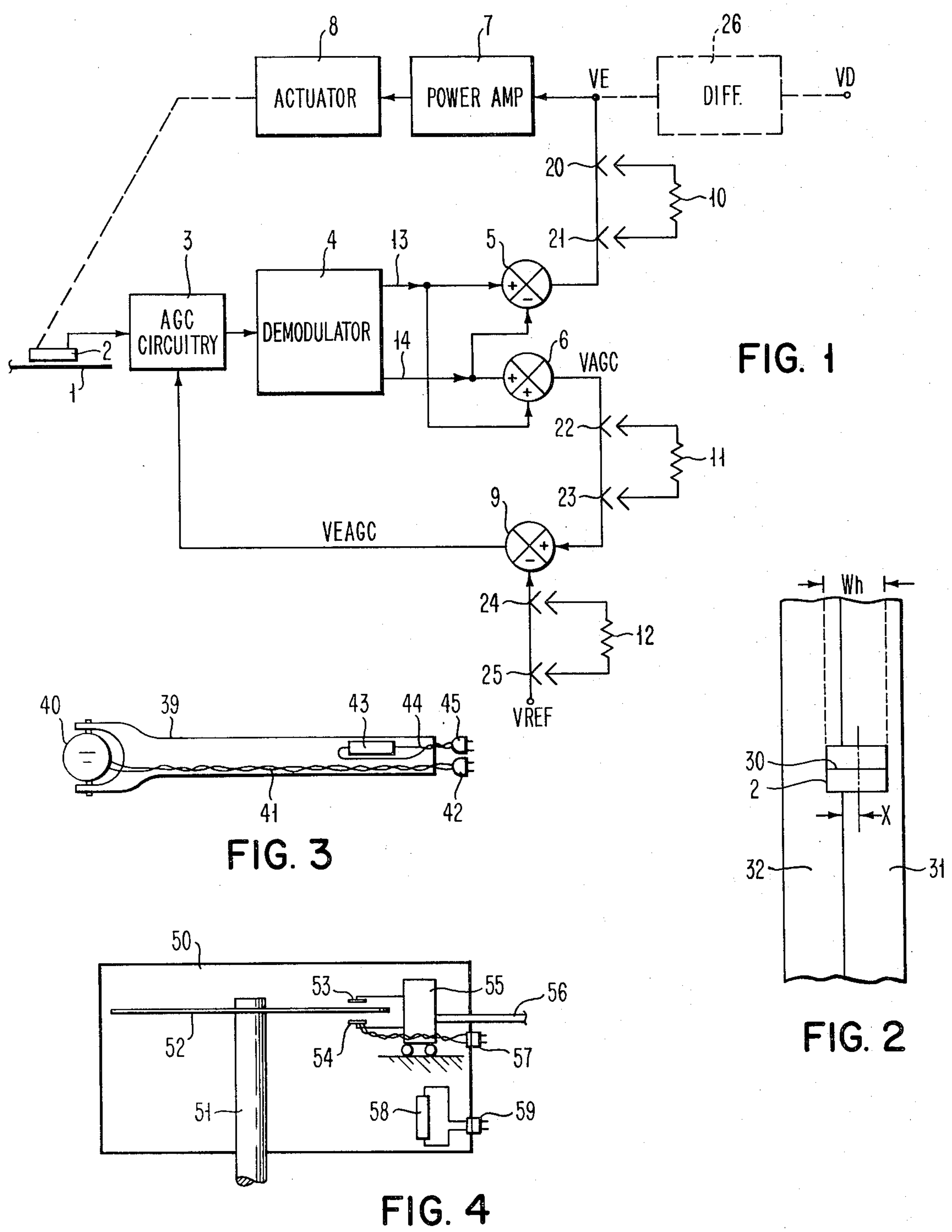
FIG. 1 shows a track following servo system of a type used in the invention including the position in which the compensating resistor may be placed within the track following servo system.
FIG. 2 is a schematic diagram which defines the head gap width parameter and the displacement parameter of the invention.
FIG. 3 shows a head arm assembly bearing a servo transducer and having mounted thereon the compensating resistor of the invention.
FIG. 4 shows a disk cartridge used in the third partitioned configuration including the location of the servo transducer and the compensating resistor of the invention.

FIG. 1 shows a track following servo system to which the invention is primarily directed. A magnetic disk 1 having a servo surface on the top surface contains a plurality of concentric servo tracks where the boundary between adjacent servo tracks identifies the center of an associated data track on one or more data surfaces. Additional magnetic disks may be attached to the same spindle as the servo disk and the magnetic data transducers are ganged for common movement with the servo transducer. This is not shown in the figure but is clearly shown in the referenced patents heretofore mentioned. A position signal is generated in servo transducer 2 whose gain is standardized by AGC circuitry 3. The output of the AGC circuitry 3 is fed into demodulator 4 for separating the two components which comprise the signal generated in servo transducer 2. One component is outputted from demodulator 4 on line 13, while the other component is outputted on line 14. The two signals appearing on lines 13 and 14 are subtracted to generate an error position signal VE which is indicative of displacement of servo transducer 2 from the boundary position between two servo tracks. The error position signal is fed into a power amplifier 7 which in turn controls actuator 8 for positioning the servo transducer 2 such that servo transducer 2 is centered over the boundary of the 2 servo tracks. The output signals 13 and 14 from demodulator 4 are added together by adder circuitry 6 to form the automatic gain control signal VAGC which is compared with the voltage reference signal VREF by subtraction circuitry 9 to form the error AGC signal VEAGC for controlling the AGC circuitry 3.

The AGC circuitry provides corrections for variations in the flying height of servo head 2 above the servo surface on the servo disk 1, for variations in the magnetic coating thickness of servo surface 1 and for variations in the gain characteristics of specific elements within the track following servo system, such as variations of the gain of amplifiers due to variations in temperature or aging of the amplifier.

The position error generating circuitry is basically comprised of the AGC circuitry 3, the demodulator 4, adder circuitry 6 and subtraction circuitry 5 and 9. FIG. 2 shows the servo transducer 2 having a gap 30 where the gap width is designated as $W_h$. Servo tracks are indicated by tracks 31 and 32. The displacement from the boundary condition is shown by X and is the distance between the center of the servo transducer 2 and the boundary between servo tracks 31 and 32.

The error signal generated at the output of the subtractor circuitry 5 in the position error generating circuitry is a function of the effective head width of the servo transducer.

With regard to the first two partitionings of the memory storage system as described heretofore, only the actual gap width of the servo transducer may be effectively compensated for. This is because the servo head and servo surface do not constitute a constant unique combination to the position error circuitry in that each disk pack will present a different servo surface to the servo transducer. Under this condition the gap width of the servo transducer will be compensated for.

Again with reference to FIG. 1, there is shown resistors 10, 11 and 12 which can be respectively inserted at points 20 and 21, 22 and 23 and 24 and 25. The short circuit between those two points would be disconnected when the resistor is inserted. A resistor of a correct value placed in any of these three points can provide the necessary compensation such that the error output signal will have the correct value for a given displacement and also allow the correct operation of the automatic gain control circuitry within the position error generating circuitry. If desired, more than one location may simultaneously be used. For example, proper values for the combination of resistors 10 and 11 may be found to obtain the desired conditions. Any combination of resistors 10, 11 and 12 can be used. However, from a design viewpoint, it would be most preferred to use only one resistor.

$$VE = k\,(A - B) \qquad (1)$$

and $$k = f\,[(A + B) - (VREF)] = f\,(VAGC - VREF) \qquad (2)$$

thus $$VE = (A - B)\,[(f\,(\mathrm{VAGC} - \mathrm{VREF})] \qquad (3)$$

$$VE = x(A - B)\,[f\,(y\,VAGC - zVREF)](4)$$

The value of resistor 12 controls the value of reference voltages sensed by the AGC circuit. This will appear as a multiplication factor $z$ in Equation 4. The value of resistor 11 varies the magnitude of the VAGC and appears as a multiplication factor $y$ in Equation 4. The value of resistor 10 varies the magnitude of the output of the position error generating circuitry and appears as a multiplication factor $x$ in Equation 4. It can readily be appreciated that $x$, $y$ and $z$ control the gain of the position error generating circuitry. When only one resistor is used, the multiplication factors associated with the other resistors have a value of unity.

It has further been found that it is most desirable to use compensating resistor 12 inserted at points 24 and 25 in that the integrity of the positioning system is always maintained and the ease of availability of points 24 and 25. While the method of selecting the proper value for resistor 12 will be described, it will be understood that the same method is applicable for selecting the value for resistors 10 and 11 or for any combination of resistors 10, 11 and 12.

In the first two configurations, the proper value for resistor 12 is found by mounting the head arm assembly bearing the servo transducer into a test stand wherein the servo track spacing of the system has been strictly controlled. The servo transducer is then positioned at the center of two servo tracks by means of the servo system. It should be noted that a characteristic of the track following servo system is such that even though the head gap width of the servo transducer is out of specification, it will provide a proper and correct indication of when the servo transducer is located in the center of the boundary condition between two servo tracks. This situation is due to the fact that the error signal is derived by subtracting the value of the two components of the signal generated in the servo transducer. When the transducer is centered, the two components are equal in value and thus, when subtracted will yield a zero value regardless of the magnitude of the components or the action of the AGC circuit. The servo head arm assembly is then moved a predetermined distance X from the boundary condition. This movement can be made mechanically or electrically. If it is to be electrically moved, then an input voltage is supplied to the power amplifier of a magnitude which will cause the actuator to move the servo transducer the fixed amount. Alternatively, the servo transducer can be positioned (a very small distance) very accurately by use of mechanical linkage and an optical interferometer for measuring the displacement distance.

For a given displacement X, the error output signal of subtractor 5 is a known value. The error output signal is monitored. The reference voltage is of a value greater than that which would have existed if the invention had not been incorporated. This is done so as to provide a range of gain values, both above and below the nominal value for the gain of the position error generating circuitry. The value of resistor 12 is then varied until the output error voltage equals the known value.

It is desired to maintain the value found for resistor 12 to be associated from this point on with the specific servo transducer in the test stand. One such arrangement would be to place the compensating resistor on the head arm assembly. FIG. 3 shows such an arrangement. Head arm assembly 39 bears servo transducer 40 having several leads 41 connected to plug 42. The compensating resistor 43, having the desired value, is mounted onto the head arm assembly 39 by any convenient means. The leads of the compensating resistor 44 are connected to plug 45 such that whenever head arm assembly 39 is placed into a given drive unit, both the servo transducer 40 and the compensating resistor 43 will be connected into the drive unit.

In the third partitioning of the magnetic memory storage system, the disk pack contains both the servo transducer and the servo surface. Therefore, compensation can be made for both the actual gap width of the servo transducer and for variations in the servo track width. Thus, the total effective gap width of the servo transducer is compensated for and the manufacturing tolerances associated with both of these components may be relaxed.

The method for obtaining the correct value for the reference resistor is to mount a completed disk pack into a test stand and for following the procedure as outlined above. When the value of the compensating resistor is found, it may be mounted independently within the disk pack. FIG. 4 shows such an arrangement. Disk pack 50 contains magnetic disk 52 mounted to a shaft 51 and having a servo surface on the bottom side. Data transducer 53 and servo transducer 54 are mounted to a carriage assembly 55 which is mounted to a positioning rod 56. The servo transducer has its leads connected to plugs 57. Compensating resistor 58 has its leads connected to plugs 59. When disk cartridge 50 is mounted within the disk drive unit, connection is made between plugs 57 and 59 and mechanical connection made between points 56 and 51.

An alternate method for obtaining the desired value for the compensating resistors is to move servo transducer across the servo disk at a fixed velocity. The output error signal from subtractor 5 is then fed into a differentiator 26 which produces an output voltage which is a function of the gain characteristic of the demodulator. The differentiated signal VD has a known value for a given velocity. Compensator resistor 12 is then inputted into the circuit and varied until the output voltage of the differentiator is equal to the predetermined, desired value. The advantage of producing the value for the compensating resistor by this method is that it averages the track width of the servo disk as the servo transducer passes over the surface of the servo disk. Therefore, if one given track happened to be defective in some manner while other tracks are not, this method would produce correct results.

From the foregoing discussion, it can be realized that by incorporating this method of compensating for head width variations of the servo transducer in the first two partitionings of the magnetic memory system allows the tolerances of the servo transducer to be relaxed, which results in the manufacturing of the servo transducer to be less expensive and easier.

In the third configuration the tolerances associated with the head and disk may be relaxed, thereby obtaining even greater cost savings in ease of manufacturing.

The inserting of resistors 10, 11 or 12 allows the effective gain characteristic of the position error generating circuitry to be altered. While the preferred embodiments have been dealt with the use of resistors for obtaining this variation, there are alternate apparatus for varying the gain of the position error generating circuitry. One such apparatus is to use an amplifier for the resistors. Another such apparatus is to have an optical code stamped onto the magnetic head or head arm assembly in the first two partitioned configurations or onto the disk pack in the third partitioned configuration of the magnetic memory system. Optical means would read the code when either the head arm assembly was inserted into the disk drive in the first two configurations or the disk cartridge was inserted into the disk drive as in the third configuration. The optical reading of the optical code generates a corresponding binary number which is fed into a digital-to-analog converter for generating the reference voltage. The generation of the reference voltage may be by generating the exact value of the reference voltage to be used or a voltage to be added to or subtracted from a standard voltage. In this embodiment, points 24 and 25 are used in a system and not points 20 and 21 or 22 and 23 as shown in FIG. 1.

It can be readily appreciated by those skilled in the art that the addition of a single compensating resistor can provide a solution to a most perplexing problem, that is, how to relax manufacturing tolerances for the gap width of the servo transducer and in some cases the servo track widths while the state of the art seeks higher track densities which would require tighter manufacturing tolerances on these components.

While the discussion of the invention has been directed primarily to the environment of magnetic disk drive memory storage systems, it should be understood that the invention is directly applicable to positioning systems on a single plane, such as on a magnetic drum or a tape system. The teachings of this invention are also directly applicable to magnetic disk systems wherein the servo information is located in one band of tracks on a magnetic disk and data is located in another band or bands wherein the servo and data transducers are co-mounted onto a common head arm assembly.

While the invention has been particularly shown and described with reference to the preferred embodiments, heretofore described, it will be understood by those skilled in the art that various changes in form and detail may be made therein without departing from the spirit and scope of the invention.

What is claimed is:

1. In a magnetic memory system employing a track following servo system for positioning a servo transducer to the boundary of two servo tracks so as to locate one or more data transducers to the center of a desired data track on one or more magnetic data surfaces, an apparatus for compensating for variations in the effective gap width of servo transducers comprising:

error circuitry employing automatic gain control for generating an error signal indicator of the displacement of the servo transducer from the boundary of two servo tracks; and means associated with each servo transducer, each means connected to the error circuitry when its associated servo transducer is inserted into the servo system for rendering the error circuitry insensitive to any variation in the effective gap width associated with said servo transducers being used from the ideal effective gap width for the servo system.

2. The apparatus of claim 1 wherein said means alters the gain characteristic of the error circuitry to cause the error position signal to be a predetermined value for a predetermined displacement of the servo transducer from the boundary of two servo tracks.

3. The apparatus of claim 2 wherein said means is a resistor.

4. The apparatus of claim 3 wherein the resistor is connected between the AGC error subtracting junction and the AGC reference voltage.

5. The apparatus of claim 3 wherein the resistor is connected between the AGC error subtracting junction and the AGC summing junction.

6. The apparatus of claim 3 wherein the resistor is connected between the error position summing junction and the power amplifier.

7. The apparatus of claim 1 wherein the magnetic memory system is partitioned into a disk file and a disk cartridge, the disk cartridge including data transducers and a servo transducer attached to a positioning mechanism, said means compensating for variations in the actual gap width of the servo heads and for variations in servo track width which combine to form the effective gap width of the servo transducer.

8. The apparatus of claim 7 wherein said means alters the gain characteristic of the error circuitry to cause the error position signal to be a predetermined value for a predetermined displacement of the servo transducer from the boundary of two servo tracks.

9. The apparatus of claim 8 wherein said means is a resistor.

10. The apparatus of claim 9 wherein the resistor is connected between the AGC error subtracting junction and the AGC reference voltage.

11. The apparatus of claim 9 wherein the resistor is connected between the AGC error subtracting junction and the AGC summing junction.

12. The apparatus of claim 9 wherein the resistor is connected between the error position summing junction and the power amplifier.

13. The apparatus of claim 1 wherein said compensating means compensates only for variations in the actual head gap width parameters of the effective gap width of the servo transducer.

14. The apparatus of claim 13 wherein said means alters the gain characteristic of the error circuitry to cause the error position signal to be a predetermined value for a predetermined displacement of the servo transducer from the boundary of two servo tracks.

15. The apparatus of claim 14 wherein said means is a resistor.

16. The apparatus of claim 15 wherein the resistor is connected between the AGC error subtracting junction and the AGC reference voltage.

17. The apparatus of claim 15 wherein the resistor is connected between the AGC error subtracting junction and the AGC summing junction.

18. The apparatus of claim 15 wherein the resistor is connected between the error position summing junction and the power amplifier.

19. A magnetic disk storage system comprising:

a disk drive unit having a portion of a track following servo system, including position error circuitry having automatic gain control circuitry, a plurality of disk packs, each having the remaining portion of the track following servo system including the servo transducer, mounting means for mounting any one of said disk packs into said disk drive unit to form an operational storage system, and means within each said disk pack coacting with said disk drive unit when said disk pack is mounted on said disk drive to vary the gain characteristics of said position error circuitry making said error circuitry insensitive to any variations in the effective gap width of the servo transducers associated with said mounted disk pack from the ideal value of the effective gap width.

20. The apparatus of claim 19 wherein said means is a resistor.

21. The apparatus of claim 20 wherein the resistor is connected between the AGC error subtracting junction and the AGC reference voltage.

22. The apparatus of claim 20 wherein the resistor is connected between the AGC error subtracting junction and the AGC summing junction.

23. The apparatus of claim 20 wherein the resistor is connected between the error position summing junction and the power amplifier.

* * * * *